F. BUCKHALTER.
MILK BOTTLE CLOSER.
APPLICATION FILED JULY 6, 1908.

901,777.

Patented Oct. 20, 1908.

WITNESSES
Chas. K. Davis
Myron G. Clea

Frederick Buckhalter.
INVENTOR

C. L. Parker.
Attorney

THE NORRIS PETERS CO., WASHINGTON, D. C.

UNITED STATES PATENT OFFICE.

FREDERICK BUCKHALTER, OF ASHBOURNE, PENNSYLVANIA.

MILK-BOTTLE CLOSER.

No. 901,777.　　　　Specification of Letters Patent.　　　　Patented Oct. 20, 1908.

Application filed July 6, 1908. Serial No. 442,089.

*To all whom it may concern:*

Be it known that I, FREDERICK BUCKHALTER, a citizen of the United States, residing at Ashbourne, in the county of Montgomery and State of Pennsylvania, have invented certain new and useful Improvements in Milk-Bottle Closers, of which the following is a specification.

My invention relates to milk bottle closers of that character employed in the household as a stopper for a milk bottle where a portion of the contents thereof are poured out at different times, and the object of my invention is to provide a closer which may be conveniently and easily inserted in position within the mouth of the bottle, or withdrawn therefrom; which will be simple and cheap in construction, and in which means are provided for removing the ordinary bottle cap, which means operate in a novel manner to clamp the several parts of the device together.

Figure 1:
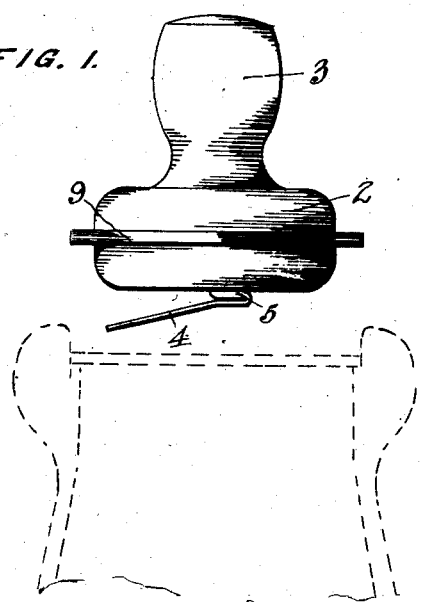
Figure 2:
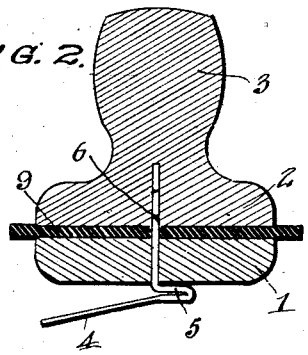
Figure 3:
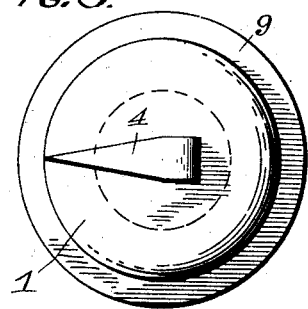
Figure 5:
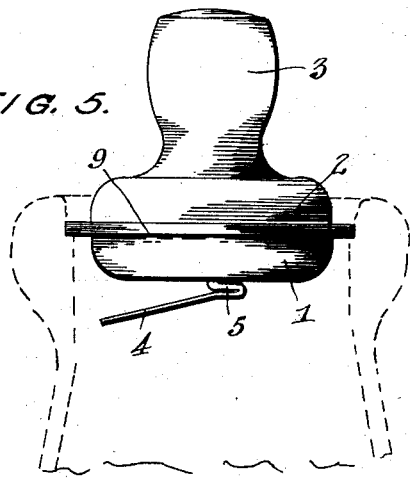
Figure 4:
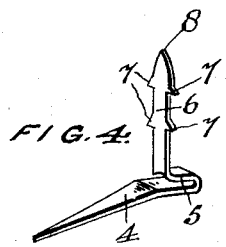

In the accompanying drawings, forming a part of this specification, Figure 1 is an elevation of my improved milk bottle closer, illustrating the same in position for insertion within the mouth of the milk bottle. Fig. 2 is a central vertical sectional view taken through my improved closer. Fig. 3 is a bottom plan view thereof. Fig. 4 is a perspective view of my improved cap removing prong, removed, and, Fig. 5 is a view similar to Fig. 1, illustrating my improved closer inserted in position within the mouth of the milk bottle.

In the practical embodiment of my invention, I provide a pair of circular clamping sections 1 and 2, preferably constructed of a suitable wood, and of substantially reduced diameter to that of the mouth of a milk bottle. One of the clamping sections, the clamping section 2, herein shown, is provided with a central outwardly extending rounded boss or knob 3, constituting a handle, while the other section 1 is provided with a small slotted central opening extending therethrough for a purpose to be hereinafter described. Between the clamping sections 1 and 2, is disposed a circular disk 9, preferably of rubber or like material of greater diameter than that of the sections 1 and 2 and adapted to snugly fit within the mouth of a milk bottle. A sharpened prong 4 is further provided, having a short portion 5 doubled back thereon, to provide a head and having an extending shank 6 bent at right angles to said portion 5 and provided with a series of angularly projecting teeth 7, which shank 6 is sharpened at its extremity 8, and is adapted for insertion through the said central slotted opening in the clamping section 1 and is adapted to be driven through the disk 9 and into the clamping section 2 by a series of blows upon its head formed by the double portion 5 until said doubled portion rests against the adjacent face of the clamping section 1, whereby the teeth 7 engage the material of the clamping section 2 and prevent the withdrawal of the prong 4. The prong 4 thus extends at an angle over the face of the clamping section 1, and being of a length not greater than one-half the diameter of said disk, is readily adaptable to be thrust into and through the ordinary pasteboard milk bottle cap, in order that the same may be withdrawn. The parts are thus assembled and locked together by means of the shank 6 of the prong 4 and the device is then ready for insertion within the mouth of a milk bottle as shown in Fig. 5 in order to keep the contents of the milk bottle intact when a portion only of such contents are used from time to time.

Having described my invention, I claim:

A milk bottle closer of the character described, comprising a pair of circular opposing clamping sections, a circular flexible disk carried between said sections, and a sharpened metallic cap removing prong, one of said clamping sections being provided with a central outwardly extending boss or knob, forming a handle, and said cap removing prong being provided with an angular shank at one end thereof, having projecting teeth and adapted for engagement through the opposite one of said clamping sections, and with an intermediate portion bent back upon itself to form a head whereby the said shank may be driven through said flexible disk and into the material of said clamping section provided with said handle, to engage the material thereof with its said teeth, and to clamp said sections, and said disk together, substantially as described.

In testimony whereof I affix my signature in presence of two witnesses.

FREDERICK BUCKHALTER.

Witnesses:
　CHARLES J. MILLER,
　WM. F. MILLER.